US012709118B2

(12) United States Patent
Hoshiba et al.

(10) Patent No.: US 12,709,118 B2
(45) Date of Patent: Aug. 18, 2026

(54) PNEUMATIC TIRE

(71) Applicant: The Yokohama Rubber Co., LTD., Tokyo (JP)

(72) Inventors: Takashi Hoshiba, Hiratsuka (JP); Masahiro Naruse, Hiratsuka (JP); Jun Matsuda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 648 days.

(21) Appl. No.: 17/262,713

(22) PCT Filed: Jul. 17, 2019

(86) PCT No.: PCT/JP2019/028153
§ 371 (c)(1),
(2) Date: Jan. 23, 2021

(87) PCT Pub. No.: WO2020/022159
PCT Pub. Date: Jan. 30, 2020

(65) Prior Publication Data

US 2021/0300127 A1 Sep. 30, 2021

(30) Foreign Application Priority Data

Jul. 24, 2018 (JP) ................................ 2018-138616

(51) Int. Cl.
*B60C 19/00* (2006.01)
*B60C 23/00* (2006.01)

(52) U.S. Cl.
CPC .......... *B60C 19/002* (2013.01); *B60C 19/003* (2013.01); *B60C 2019/004* (2013.01)

(58) Field of Classification Search
CPC ................ B60C 19/002; B60C 19/003; B60C 2019/004
See application file for complete search history.

(56) References Cited

U.S. PATENT DOCUMENTS 3,905,823 A * 9/1975 Piskoti .................... B29C 33/64 106/287.15
2003/0155054 A1 8/2003 Bell
2005/0205183 A1* 9/2005 Yukawa ................ B60C 19/002 152/157

(Continued)

FOREIGN PATENT DOCUMENTS

DE 60309438 T2 9/2007
JP 2004314895 A * 11/2004

(Continued)

OTHER PUBLICATIONS

Machine Translation: KR19990068976A, N/A, (Year: 2023).*

(Continued)

*Primary Examiner* — Kendra Ly
(74) *Attorney, Agent, or Firm* — Thorpe North & Western

(57) ABSTRACT

A pneumatic tire includes at least one sound absorbing member having a band-like shape. The sound absorbing member is bonded to an inner surface of a tread portion along a tire circumferential direction. A correction body for correcting weight unbalance is fixed to a tire inner surface in a range corresponding to a light point of an entire tire including the sound absorbing member.

15 Claims, 10 Drawing Sheets

(56) References Cited

U.S. PATENT DOCUMENTS

2005/0217777 A1* 10/2005 Yukawa .................... B60B 3/04 152/381.6
2006/0272759 A1 12/2006 Yukawa
2007/0146124 A1 6/2007 Shinmura
2009/0090446 A1 4/2009 Ikeda et al.
2011/0041977 A1 2/2011 Shepler
2011/0056612 A1* 3/2011 Sugimoto ............... C08L 53/00 156/110.1
2011/0212265 A1 9/2011 Seitz
2012/0073717 A1 3/2012 Agostini et al.
2012/0125498 A1* 5/2012 Majumdar ................ B60C 1/00 152/154.1
2015/0191053 A1 7/2015 Shouyama
2015/0328942 A1 11/2015 Weston
2016/0288587 A1* 10/2016 Tanno ..................... B60C 11/00
2017/0066294 A1* 3/2017 Nagaya ............... B60C 23/0493
2018/0134103 A1* 5/2018 Bruneau .......... G06K 19/07764
2019/0160890 A1 5/2019 Shinzawa

FOREIGN PATENT DOCUMENTS

JP 2005-205937 8/2005
JP 2006-335199 12/2006
JP 2007-237962 9/2007
JP 2007-331295 12/2007
JP 2012-071601 4/2012
JP 2014-169060 9/2014
JP 2015116689 A * 6/2015
JP 2016-505438 2/2016
JP 6272225 1/2018
JP 2018-024352 2/2018
JP 2018-065494 4/2018
KR 19990068976 A * 9/1999
WO WO 2007/102279 9/2007
WO WO 2008/009696 A1 1/2008
WO WO 2014/010728 1/2014
WO WO 2014/081409 5/2014
WO WO 2015/076381 5/2015
WO WO 2018/012087 1/2018
WO WO 2018/030535 2/2018

OTHER PUBLICATIONS

Machine Translation: JP-2015116689-A, Sakakibara K, (Year: 2023).*
Machine Translation: JP-2004314895-A, Ikebayashi H, (Year: 2023).*
International Search Report for International Application No. PCT/JP2019/028153 dated Sep. 10, 2019, 4 pages, Japan.

* cited by examiner 6
4
3
5
2
10
1
3
2

6
4
3
5
2
10a
10b
1
3
2

6a
(6)
6b
(6)
4
3
5
2
10
1
3
2

6a
(6)
6b
(6)
4
3
5
2
10
1
3
2

PNEUMATIC TIRE

TECHNICAL FIELD

The present technology relates to a pneumatic tire with a sound absorbing member bonded to a tire inner surface and particularly relates to a pneumatic tire in which a correction body to correct weight unbalance is disposed to ensure reducing degradation of the balance of the tire.

BACKGROUND ART

A sensor unit including a sensor for acquiring tire internal information, such as an internal pressure and a temperature, has been installed in a tire cavity (for example, see Japan Patent No. 6272225 and Japan Unexamined Patent Publication No. 2016-505438). However, when the sensor unit is installed to a pneumatic tire in which a sound absorbing member having a band-like shape is bonded to a tire inner surface, there are problems that an installation position of the sensor unit is limited and the balance of the tire is degraded depending on the installation position of the sensor unit.

SUMMARY

The present technology provides a pneumatic tire that ensures suppressing degradation of the balance of the tire by disposing a correction body to correct weight unbalance.

A pneumatic tire includes at least one sound absorbing member having a band-like shape and a correction body. The sound absorbing member is bonded to an inner surface of a tread portion along a tire circumferential direction. The correction body for correcting weight unbalance is fixed to a tire inner surface in a range corresponding to a light point of an entire tire including the sound absorbing member.

In an embodiment of the present technology, the at least one sound absorbing member having the band-like shape is bonded to the inner surface of the tread portion along the tire circumferential direction. The correction body for correcting the weight unbalance is fixed to the tire inner surface in the range corresponding to the light point in the entire tire including the sound absorbing member. Accordingly, the correction body is added to a position where weight is the lightest on a circumference of the pneumatic tire provided with the sound absorbing member. The correction body can suppress the degradation of the balance of the tire.

The embodiment of the present technology is preferably as follows. The two sound absorbing members are provided. The sound absorbing members are disposed to be separated from one another in a tire width direction. When the plurality of sound absorbing members are disposed on the tire inner surface, contact between the sound absorbing members is avoided, and damage to the sound absorbing member can be reduced.

The embodiment of the present technology is preferably as follows. The correction body is disposed between the sound absorbing members in the tire width direction. Accordingly, damage to the correction body when a rim is mounted can be reduced.

The embodiment of the present technology is preferably as follows. A first sound absorbing member constituting the sound absorbing member is disposed on one side in a tire width direction from a position 40% of a width of a land portion from an end portion on the one side in the tire width direction to another side in the tire width direction of the land portion on a tire equator line. A second sound absorbing member constituting the sound absorbing member is disposed on the other side in the tire width direction from the position 40% of the width of the land portion from an end portion on the other side in the tire width direction to the one side in the tire width direction of the land portion. The first sound absorbing member and the second sound absorbing member constituting the sound absorbing member are separated by 60% or greater of the width of the land portion. When the plurality of sound absorbing members are disposed on the tire inner surface, the sound absorbing member needs to be disposed also at or near a region corresponding to a shoulder portion. The sound absorbing member disposed in the portion cannot sufficiently ensure high-speed durability in some cases. Disposing the plurality of sound absorbing members on the tire inner surface as described above allows effectively suppressing accumulation of heat at a center portion in the tire width direction during traveling at high speed and enhancing high-speed durability.

The embodiment of the present technology is preferably as follows. The correction body is disposed closer to an inner side in a tire width direction than a ground contact edge. Thus, adhesiveness between the tire inner surface and the correction body can be effectively improved. In particular, in a case where the correction body is a sensor unit including a sensor that detects an amount of wear of the tread portion, the sensor can accurately acquire tire information. The embodiment of the present technology is preferably as follows. A separation distance between the sound absorbing member and the correction body in the tire width direction is not less than 5 mm. As a result, contact between the sound absorbing member and the correction body can be avoided, and damage to the sound absorbing member or the correction body can be reduced.

The embodiment of the present technology is preferably as follows. An amount of silicon in a release agent detected in at least a fixed region of the correction body by a fluorescence X-ray analysis method is not greater than 10.0 wt. %. Alternatively, a thickness of a release agent detected in at least a fixed region of the correction body by an electron microscope is not greater than 100 μm. When a trace amount of the release agent is attached to the tire inner surface in this manner, while the release agent inhibits permeation of air from the tire inner surface and improves air retention properties, adhesiveness between the tire inner surface and the correction body can be sufficiently ensured.

The embodiment of the present technology is preferably as follows. The correction body is fixed to the tire inner surface via an adhesive layer. An adhesive strength of the adhesive layer is in a range of from 0.4 $N/mm^2$ to 100 $N/mm^2$. Accordingly, installation work of the correction body can be easily performed while the adhesive strength of the adhesive layer is successfully maintained. The adhesive strength (tensile lap-shear strength) of the adhesive layer is compliant to any of JIS (Japanese Industrial Standard)-K6850 and JIS-Z0237, and is the adhesive strength measured in a standard state (23° C., RH50%).

The embodiment of the present technology is preferably as follows. The adhesive layer is made of a cyanoacrylate-based adhesive. As a result, time for the installation work of the correction body can be shortened.

The embodiment of the present technology is preferably as follows. The correction body is directly adhered to the tire inner surface. As a result, in a case where the correction body is the sensor unit including the sensor that detects the amount of wear of the tread portion, the sensor can accurately acquire the tire information.

The embodiment of the present technology is preferably as follows. A base is inserted between the correction body and the tire inner surface. As a result, in a case where a material that can follow tire deformation is used as a material of the base, peeling of the correction body due to tire deformation can be reduced.

The embodiment of the present technology is preferably as follows. As a tire inner surface roughness in a fixed region of the correction body, an arithmetic mean height Sa is in a range of from 0.3 μm to 15.0 μm, and a maximum height Sz is in a range of from 2.5 μm to 60.0 μm. As a result, an adhesion area between the tire inner surface and the adhesive layer can be increased, and the adhesiveness between the tire inner surface and the correction body can be effectively improved. The tire inner surface roughness is measured in accordance with ISO (International Organization for Standardization) 25178. The arithmetic mean height Sa is an average of absolute values of a difference in height at respective points to an average surface of the surface, and the maximum height Sz is a distance in a height direction from the highest point to the lowest point on the surface.

The embodiment of the present technology is preferably as follows. The correction body is a sensor unit configured to acquire tire information. Such a correction body can function as the sensor unit for acquiring the tire information while functioning as the correction body for correcting the weight unbalance of the tire.

In the embodiment of the present technology, the ground contact edge is an end portion in a tire axial direction when the tire is mounted on a regular rim and inflated to a regular internal pressure, and placed vertically upon a flat surface with a regular load applied thereto. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). In the system of standards, including standards on which tires are based, "regular internal pressure" is air pressure defined by each of the standards for each tire and is referred to as "maximum air pressure" in the case of JATMA, the maximum value being listed in the table "TIRE LOAD LIMITS AT VARIOUS COLD INFLATION PRESSURES" in the case of TRA, and is "INFLATION PRESSURE" in the case of ETRTO. However, "regular internal pressure" is 250 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 80% of the loads described above for a tire on a passenger vehicle.

DETAILED DESCRIPTION

Figure 1:
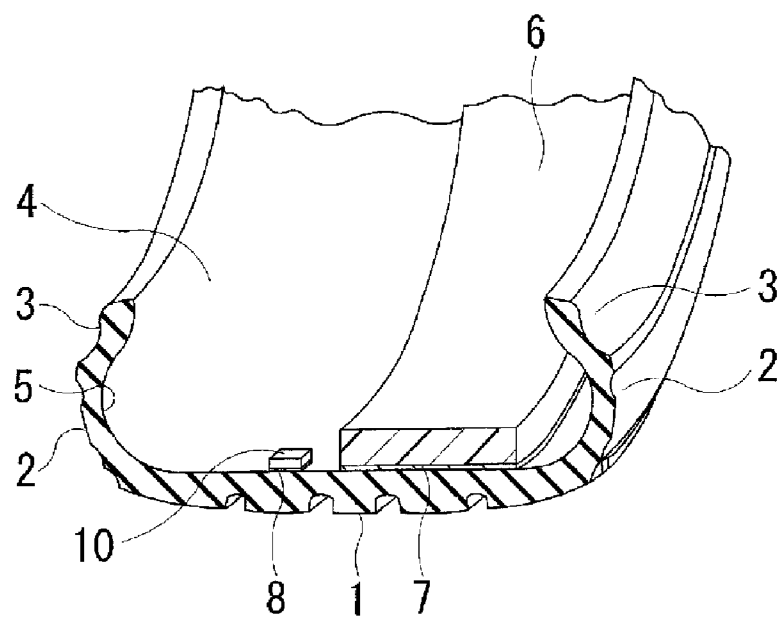
FIG. 1 is a perspective cross-sectional view of a pneumatic tire according to an embodiment of the present technology.
Figure 2:
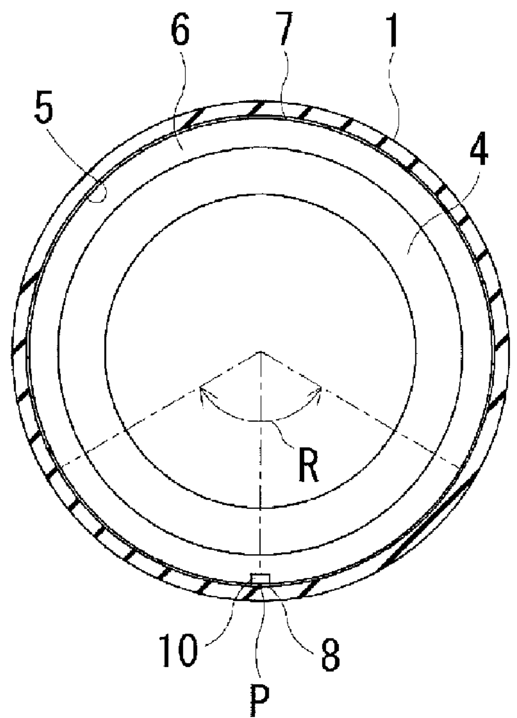
FIG. 2 is a cross-sectional view of the pneumatic tire according to an embodiment of the present technology.
Figure 3:
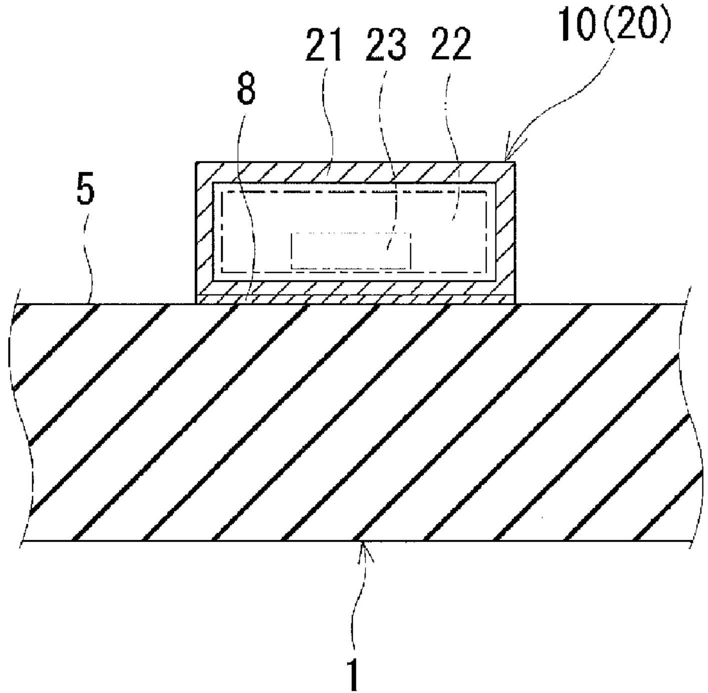
FIG. 3 is a cross-sectional view illustrating an enlarged portion of a part of the pneumatic tire according to an embodiment of the present technology.

Configurations of embodiments of the present technology will be described in detail below with reference to the accompanying drawings. FIGS. 1 to 3 illustrate a pneumatic tire according to an embodiment of the present technology. In FIG. 1, the pneumatic tire according to the present embodiment includes a tread portion 1 extending in a tire circumferential direction having an annular shape, a pair of sidewall portions 2 disposed on both sides of the tread portion 1, and a pair of bead portions 3 disposed on an inner side of the sidewall portions 2 in a tire radial direction. A sound absorbing member 6 having a band-like shape is mounted on a cavity portion 4 surrounded by the tread portion 1, the sidewall portions 2, and the bead portions 3. This sound absorbing member 6 is disposed in a region corresponding to the tread portion 1 on a tire inner surface 5.

The sound absorbing member 6 is fixed to the region corresponding to the tread portion 1 on the tire inner surface 5 along the tire circumferential direction via an adhesive layer 7. The sound absorbing member 6 is made of a porous material with open cells and has predetermined sound absorbing properties based on the porous structure. Polyurethane foam is preferably used as the porous material of the sound absorbing member 6. On the other hand, the adhesive layer 7 is not particularly limited, and, for example, an adhesive or a double-sided adhesive tape can be used as the adhesive layer 7.

In the pneumatic tire described above, a correction body 10 to correct weight unbalance is fixed to the tire inner surface 5. The correction body 10 fixed to the tire inner surface 5 is disposed in a range corresponding to a light point P in the entire tire including the sound absorbing member 6. The light point P is a position where the weight is the lightest on the circumference of the entire tire including the sound absorbing member 6. The range corresponding to the light point P in the entire tire is a region R (see FIG. 2) ±600 with respect to the light point P around the center axis of a tire main body. Preferably, the range is the region R±30° with respect to the light point P around the center axis of the tire main body. The correction body 10 and the sound absorbing member 6 are not in contact but are disposed separated from one another. An adhesive layer 8 is provided between the correction body 10 and the tire inner surface 5, and the correction body 10 is adhered to the tire inner surface 5 via the adhesive layer 8.

The adhesive layer 8 is made of a liquid adhesive or a double-sided adhesive tape. Examples of the adhesive can include a reaction curable type adhesive containing an epoxy resin or a urethane resin. In particular, since working time for installing the correction body 10 on the tire inner surface 5 is shortened, the adhesive layer 8 is preferably made of a cyanoacrylate-based adhesive (instantaneous adhesive).

The correction body 10 is not particularly limited, and it is only required that the correction body 10 have a weight to ensure correcting the weight unbalance. Examples of the correction body 10 can include a sensor unit that includes a sensor to acquire tire information and a device configured to reduce cavernous resonance by a mechanism different from the sound absorbing member 6. In particular, when the correction body 10 is the sensor unit, the correction body 10 functions as the correction body for correcting the weight unbalance of the tire and functions as the sensor unit for acquiring the tire information.

As illustrated in FIG. 3, the correction body 10 (sensor unit 20) includes a housing 21 and an electronic component 22. The housing 21 has a hollow structure and accommodates the electronic component 22 therein. The electronic component 22 includes, for example, a sensor 23 to acquire the tire information, a transmitter, a receiver, a control circuit, and a battery as appropriate. Examples of the tire information acquired by the sensor 23 can include an internal temperature and an internal pressure of the pneumatic tire and an amount of wear of the tread portion 1. For example, a temperature sensor or a pressure sensor is used to measure the internal temperature or the internal pressure. To detect the amount of wear of the tread portion 1, as the sensor 23, a piezoelectric sensor that abuts on the tire inner surface 5 can be used. The piezoelectric sensor detects an output voltage according to deformation of the tire during traveling and detects the amount of wear of the tread portion 1 based on the output voltage. Other than that, an acceleration sensor or a magnetic sensor can be used. Further, the sensor unit 20 transmits the tire information acquired by the sensor 23 to outside of the tire. Note that the internal structure of the sensor unit 20 illustrated in FIG. 3 is an example of the sensor unit and is not limited thereto.

In the pneumatic tire described above, the correction body 10 for correcting the weight unbalance is fixed to the tire inner surface 5 in the range corresponding to the light point P in the entire tire including the sound absorbing member 6. Accordingly, the correction body 10 is added to a position where the weight is the lightest on the circumference of the pneumatic tire provided with the sound absorbing member 6. The correction body 10 can suppress the degradation of the balance of the tire.

In FIGS. 1 to 3, the correction body 10 (sensor unit 20) is disposed closer to the inner side in a tire width direction than a ground contact edge. Thus, adhesiveness between the tire inner surface 5 and the correction body 10 can be effectively improved. In particular, in the case where the correction body 10 is the sensor unit 20 including the sensor 23 that detects the amount of wear of the tread portion 1, the sensor 23 can accurately acquire the tire information by disposing the correction body 10 closer to the inner side in the tire width direction than the ground contact edge.

Additionally, the correction body 10 (sensor unit 20) is directly adhered to the tire inner surface 5. In the case where the correction body 10 is the sensor unit 20 including the sensor 23 that detects the amount of wear of the tread portion 1, the sensor 23 can accurately acquire the tire information by directly attaching the correction body 10 to the tire inner surface 5.

In the pneumatic tire described above, preferably a separation distance between the sound absorbing member 6 and the correction body 10 in the tire width direction is not less than 5 mm. In particular, the separation distance from the sound absorbing member 6 disposed closest to the correction body 10 is preferably not greater than 50 mm. By appropriately setting the distance between the sound absorbing member 6 and the correction body 10 in this manner, contact between the sound absorbing member 6 and the correction body 10 can be avoided, and damage to the sound absorbing member 6 or the correction body 10 can be reduced. Here, when the separation distance between the sound absorbing member 6 and the correction body 10 is less than 5 mm, the sound absorbing member 6 is easily in contact with the correction body 10. On the other hand, when the separation distance from the sound absorbing member 6 disposed closest to the correction body 10 exceeds 50 mm, the sound absorbing member 6 is easily separated because the sound absorbing member 6 approaches a shoulder portion that largely deforms during traveling.

Furthermore, the adhesive strength of the adhesive layer 8 is preferably in a range of from 0.4 N/mm$^2$ to 100 N/mm$^2$, and more preferably in a range of from 5.0 N/mm$^2$ to 80 N/mm$^2$. By appropriately setting the adhesive strength of the adhesive layer 8 in this manner, installation work of the correction body 10 can be easily performed while the adhesive strength of the adhesive layer 8 is successfully maintained. Here, when the adhesive strength of the adhesive layer 8 is less than 0.4 N/mm$^2$, the adhesiveness between the tire inner surface 5 and the correction body 10 is degraded, and the correction body 10 easily peels off. On the other hand, when the adhesive strength of the adhesive layer 8 is greater than 100 N/mm$^2$, replacement work cannot be easily performed when the correction body 10 is replaced.

Furthermore, as a roughness of the tire inner surface 5 in the fixed region of the correction body 10, an arithmetic mean height Sa is preferably in a range of from 0.3 μm to 15.0 μm, and/or a maximum height Sz is preferably in a range of from 2.5 μm to 60.0 μm. In particular, more preferably, the respective arithmetic mean height Sa and maximum height Sz meet the numerical ranges described above. By appropriately setting the roughness of the tire inner surface 5 in this manner, an adhesion area between the tire inner surface 5 and the adhesive layer 8 can be increased, and the adhesiveness between the tire inner surface 5 and the correction body 10 can be effectively improved. Note that the arithmetic mean height Sa and the maximum height Sz are values measured in accordance with ISO25178, and can be measured using a commercially available surface texture measuring machine (for example, a shape analysis laser microscope or a 3D shape measuring machine). The measurement method may be any of a contact type or a non-contact type.

Figure 4:
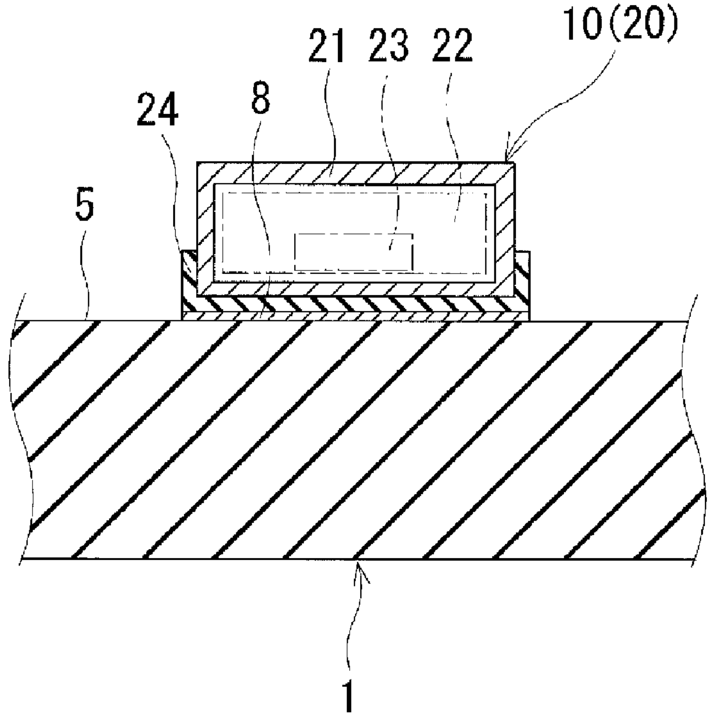
FIG. 4 is a cross-sectional view illustrating an enlarged pneumatic tire according to a modified example of an embodiment of the present technology.

FIG. 4 illustrates a pneumatic tire according to a modified example of an embodiment of the present technology. As illustrated in FIG. 4, a base 24 holding the sensor unit 20 is inserted between the correction body 10 (sensor unit 20) and the adhesive layer 8. The base 24 functions as a buffer material to reduce the peeling of the correction body 10 (sensor unit 20) due to tire deformation. Examples of the material of the base 24 can include natural rubber (NR), chloroprene rubber (Cr), butyl rubber (IIR), ethylene-propylene-diene rubber (EPDM), urethane rubber, NBR, thermoplastic elastomer, and thermosetting elastomer, and in a case where the base 24 is made of these materials, the base 24 is less likely to be damaged by tire deformation. In particular, the base 24 is preferably made of rubber having a tensile elongation at break of 80% or greater. Furthermore, the base 24 is preferably in a solid state and is more preferably in a porous state. When the base 24 is in the porous state, the base 24 has an excellent buffering effect, which is advantageous against the peeling of the correction body 10 (sensor unit 20) due to tire deformation. Because the base 24 is made of the material as described above, the base 24 can follow the tire deformation, and the peeling of the correction body 10 (the sensor unit 20) due to tire deformation can be reduced. In the embodiment illustrated in FIG. 4, an example in which the base 24 is formed to have a U shape in a cross-sectional view in the tire width direction is described, but the shape of the base 24 is not especially limited. In FIG. 4, the fixed area of the correction body 10 (sensor unit 20) corresponds to the fixed area of the base 24 where the sensor unit 20 is held.

Figure 5:
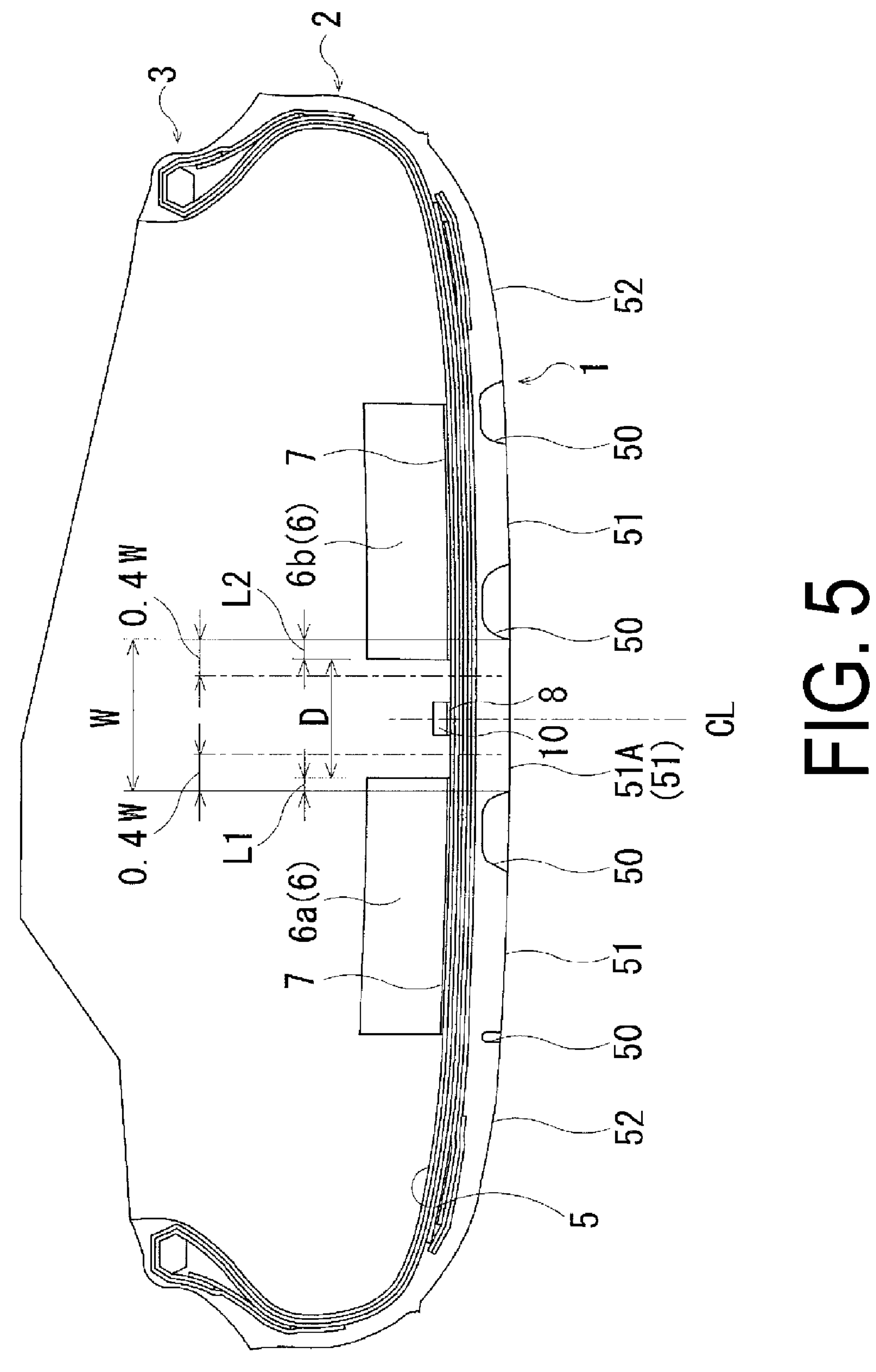
FIG. 5 is a cross-sectional view illustrating a pneumatic tire according to another modified example of an embodiment of the present technology.

FIG. 5 illustrates a pneumatic tire according to another modified example of the embodiment of the present technology. As illustrated in FIG. 5, the sound absorbing member 6 includes two members, a first sound absorbing member 6*a* and a second sound absorbing member 6*b*. The first sound absorbing member 6*a* and the second sound absorbing member 6*b* are disposed to be separated from one another in the tire width direction. When the plurality of sound absorbing members 6 are disposed on the tire inner surface 5, by separating the sound absorbing members 6 in the tire width direction, contact between the sound absorbing members 6 can be avoided and damage to the sound absorbing member 6 can be reduced. Additionally, in FIG. 5, the correction body 10 is disposed between the first sound absorbing member 6*a* and the second sound absorbing member 6*b* in the tire width direction. By disposing the correction body 10 in this manner, damage to the correction body when a rim is mounted can be reduced.

In FIG. 5, two or more circumferential grooves 50 extending in the tire circumferential direction are formed in the tread portion 1. One or more rows of land portions 51 defined by the circumferential grooves 50 by being interposed by the two circumferential grooves 50 adjacent in the tire width direction, and two rows of (one row on either side in the tire width direction) shoulder land portions 52 defined on an outer side in the tire width direction of the respective circumferential grooves 50 located outermost in the tire width direction are formed. The land portion 51 is required to include a land portion 51A disposed on a tire equator line CL and continuously extending around the entire circumference of the tire.

The first sound absorbing member 6*a* is disposed on one side in the tire width direction from a position 40% of a width W of the land portion 51A from an end portion on the one side in the tire width direction to the other side in the tire width direction on the land portion 51A on the tire equator line CL. The second sound absorbing member 6*b* is disposed on the other side in the tire width direction from the position 40% of the width W of the land portion 51A from an end portion on the other side in the tire width direction to the one side in the tire width direction on the land portion 51A. Additionally, a separation distance D between the first sound absorbing member 6*a* and the second sound absorbing member 6*b* is set to be 60% or greater of the width W of the land portion 51A. Additionally, an overlap amount L of each of the first sound absorbing member 6*a* and the second sound absorbing member 6*b* with the land portion 51A (a sum of an overlap amount L1 of the first sound absorbing member 6*a* and an overlap amount L2 of the second sound absorbing member 6*b*) is set to be not greater than 40% of the width W of the land portion 51A. As described above, a pair of the sound absorbing members 6 including the first sound absorbing member 6*a* and the second sound absorbing member 6*b* are employed, the pair of the sound absorbing members 6 are separated from one another, and the pair of the sound absorbing members 6 are disposed at positions avoiding the inner surface sides of the center land portions 51A where heat is most likely to be generated in the tread portion 1 and heat is likely to be accumulated when the sound absorbing members 6 are directly attached. Thus, the heat accumulation during traveling at high speed can be effectively suppressed, high-speed durability can be enhanced, and noise performance and high-speed durability can be improved in a well-balanced manner.

Figure 6:
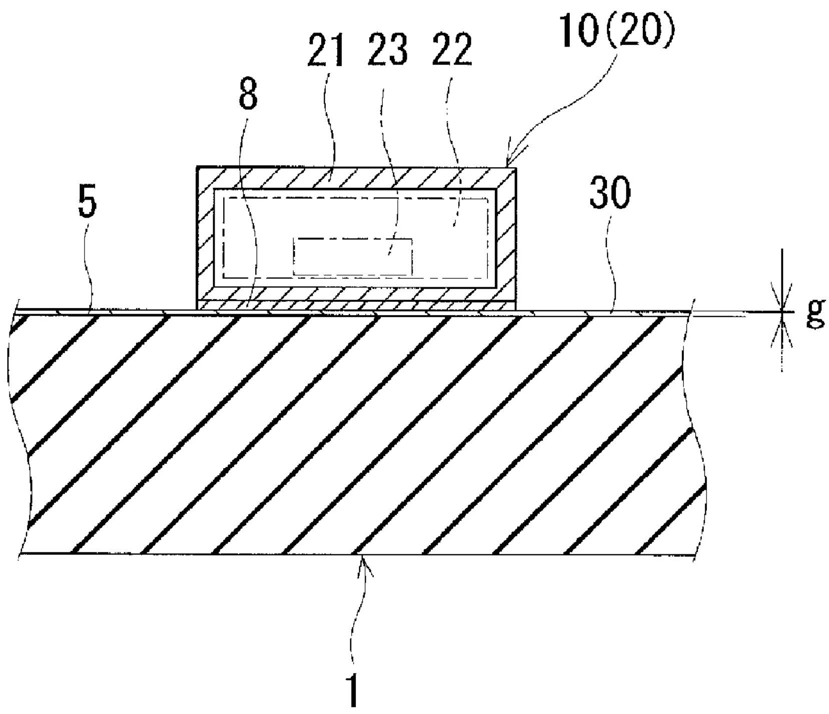
FIG. 6 is a cross-sectional view illustrating an enlarged pneumatic tire according to another modified example of an embodiment of the present technology.
Figure 8:
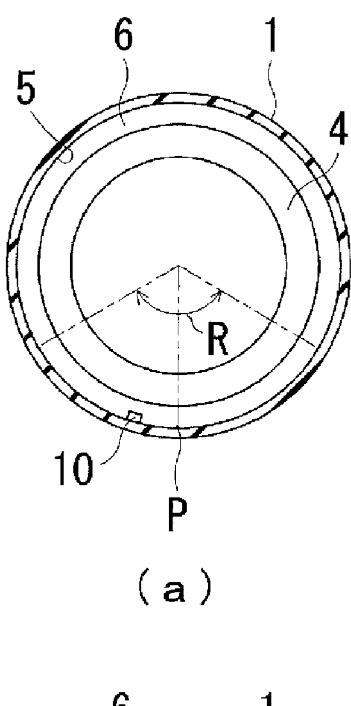
FIGS. 8A to 8C are cross-sectional views illustrating respective pneumatic tires according to other modified examples of an embodiment of the present technology.
Figure 8:
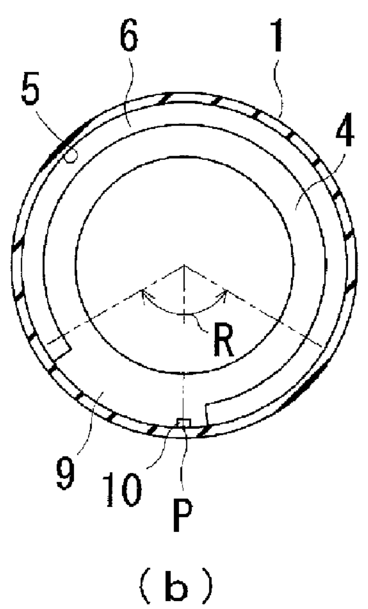
Figure 8:
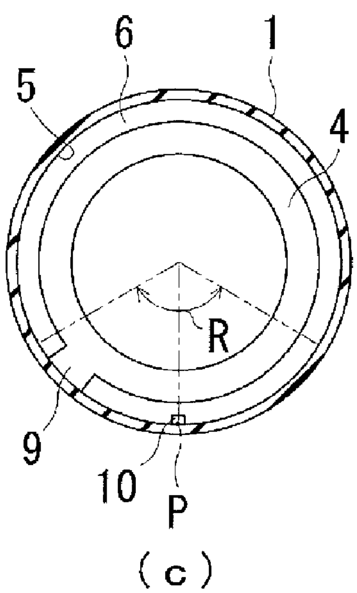

FIG. 6 illustrates a pneumatic tire according to another modified example of the embodiment of the present technology. As illustrated in FIG. 6, a release agent layer 30 made of a trace amount of a release agent attached in a manufacturing process of the pneumatic tire is present between the tire inner surface 5 and the adhesive layer 8. In other words, the correction body 10 (sensor unit 20), the adhesive layer 8, and the release agent layer 30 are layered in this order from the inner side in the tire radial direction. An amount of silicon in the release agent layer 30 in at least the fixed region of the correction body 10 (sensor unit 20) on the tire inner surface 5 is preferably not greater than 10.0 wt. %, or a thickness g of the release agent layer 30 is preferably not greater than 100 μm.

To define the amount of release agent in the inner surface of the tread portion 1, an amount of silicon as the main component of a typical release agent is used as an index. The amount of silicon can be detected using a fluorescence X-ray analysis method, and in general, while the fluorescence X-ray analysis method includes a fundamental parameter method (FP method) and a calibration curve method, the present technology employs the FP method. To measure the amount of the release agent (silicon), the amount of release agent is measured using an X-ray fluorescence spectrometer at five locations in total, the center point of the fixed region of the correction body 10 (sensor unit 20), two locations on both sides in the tire circumferential direction and two locations on both sides in the tire width direction with the center point as the center. The amounts of release agents at the five locations are averaged to calculate the amount of silicon in the release agent layer 30. X-ray fluorescence particles have an intrinsic energy proportional to an atomic number, allowing an element to be identified by measuring the intrinsic energy. Specifically, the intrinsic energy of silicon is 1.74±0.05 keV. Note that the number of X-ray fluorescence particles (X-ray intensity) of the release agent (silicon) is in a range of from 0.1 cps/μA to 1.5 cps/μA.

Meanwhile, the thickness g of the release agent layer 30 can be detected using an electron microscope. To measure the thickness g of the release agent layer 30 with the electron microscope, the thickness of the release agent is measured using the electron microscope at five locations in total, the center point of the fixed region of the correction body 10 (sensor unit 20), the two locations on both sides in the tire circumferential direction and the two locations on both sides in the tire width direction with the center point as the center. The thicknesses of the release agents at the five locations are averaged to calculate the thickness g (average thickness) of the release agent layer 30.

Examples of a component that can be combined in the release agent layer 30 include one that contains a silicone component as an active ingredient. The silicone component includes organopolysiloxanes, and the examples can include dialkylpolysiloxane, alkylphenylpolysiloxane, alkyl aralkyl polysiloxane, and 3,3,3-trifluoropropylmethylpolysiloxane. The dialkylpolysiloxane is, for example, dimethylpolysiloxane, diethylpolysiloxane, methylisopropylpolysiloxane, and methyldodecylpolysiloxane. The alkylphenylpolysiloxane is, for example, methylphenylpolysiloxane, a dimethylsiloxane methylphenylsiloxane copolymer, and dimethylsiloxane-diphenylsiloxane copolymer. The alkyl aralkyl polysiloxane is, for example, methyl(phenylethyl)polysiloxane and methyl(phenylpropyl)polysiloxane. One kind or two or more kinds of these organopolysiloxanes may be used in combination.

Next, a method for manufacturing the pneumatic tire including the release agent layer 30 illustrated in FIG. 6 will be described. To vulcanize a green tire, the release agent is coated (preferably baking application) on a bladder in advance to form a coating layer made of a release agent on an outer surface of the bladder. The step of forming the coating layer on the outer surface of the bladder is performed after the application of the release agent, for example, while the release agent is stored at 150° C. for one hour, at 90° C. for four hours, or eight hours at normal temperature. Furthermore, the step of forming the coating layer on the outer surface of the bladder is performed in a range of from not less than one time to not greater than three times. The green tire is vulcanized using the bladder in which the coating layer is formed in this manner. Then, the sound absorbing member 6 is bonded to the tire inner surface 5 of the vulcanized tire via the adhesive layer 7, and the correction body 10 is fixed via the adhesive layer 8. When the vulcanization is performed using the bladder including the coating layer made of the release agent in this manner, the release agent layer 30 is formed on the tire inner surface 5 of the vulcanized pneumatic tire. Note that, in the release agent layer 30, the release agent is not transferred over the entire surface of the tire inner surface 5 but is scattered.

Instead of the vulcanization using the bladder including the coating layer made of the release agent as described above, in the vulcanization step of the green tire, the release agent may be applied to the inner surface of the green tire, vulcanization may be performed using a regular bladder, and then the tire inner surface 5 of the vulcanized tire may be irradiated with laser. Thus, the release agent attached to the tire inner surface 5 can be removed, and by adjusting an amount of irradiation of the laser, the predetermined thickness g or amount of silicon of the release agent layer 30 can be made.

The vulcanization is performed using the bladder including the coating layer made of the release agent, or the vulcanization is performed using the regular bladder and the release agent is removed by irradiating the tire inner surface 5 of the vulcanized tire with the laser to remove the release agent as described above. This allows setting the amount of silicon in the release agent detected by the fluorescence X-ray analysis method to be not greater than 10.0 wt. %, or setting the thickness of the release agent detected by the electron microscope to be not greater than 100 μm. When the trace amount of the release agent is attached to the tire inner surface 5 in this manner, while the release agent inhibits permeation of air from the tire inner surface 5 and improves air retention properties, the adhesiveness between the tire inner surface 5 and the correction body 10 can be sufficiently ensured.

In particular, in the step of forming the coating layer on the outer surface of the bladder, a coating time t (hour) and a temperature T (° C.) of the coating layer preferably meet conditions of $t \geq 0.0001T^2 - 0.07T + 9$ and $T \leq 180°$ C. In addition, more preferably, relationship formulae between the coating time t and the temperature T described above are met and also the coating time t is set within a range of from one to eight hours. Furthermore, further preferably, the temperature T is set to be 90° C. and the coating time t is set to be four hours, and the most preferably, the temperature T is set to be 150° C. and the coating time t is set to be one hour. By meeting these conditions, the time for coating the release agent can be shortened in the bladder including the coating layer, and shortening of bladder life can be reduced. Here, as the temperature T (° C.) becomes high, the coating layer can be formed in a short time. However, the bladder is likely to be deteriorated and the bladder life is shortened.

Figure 7:
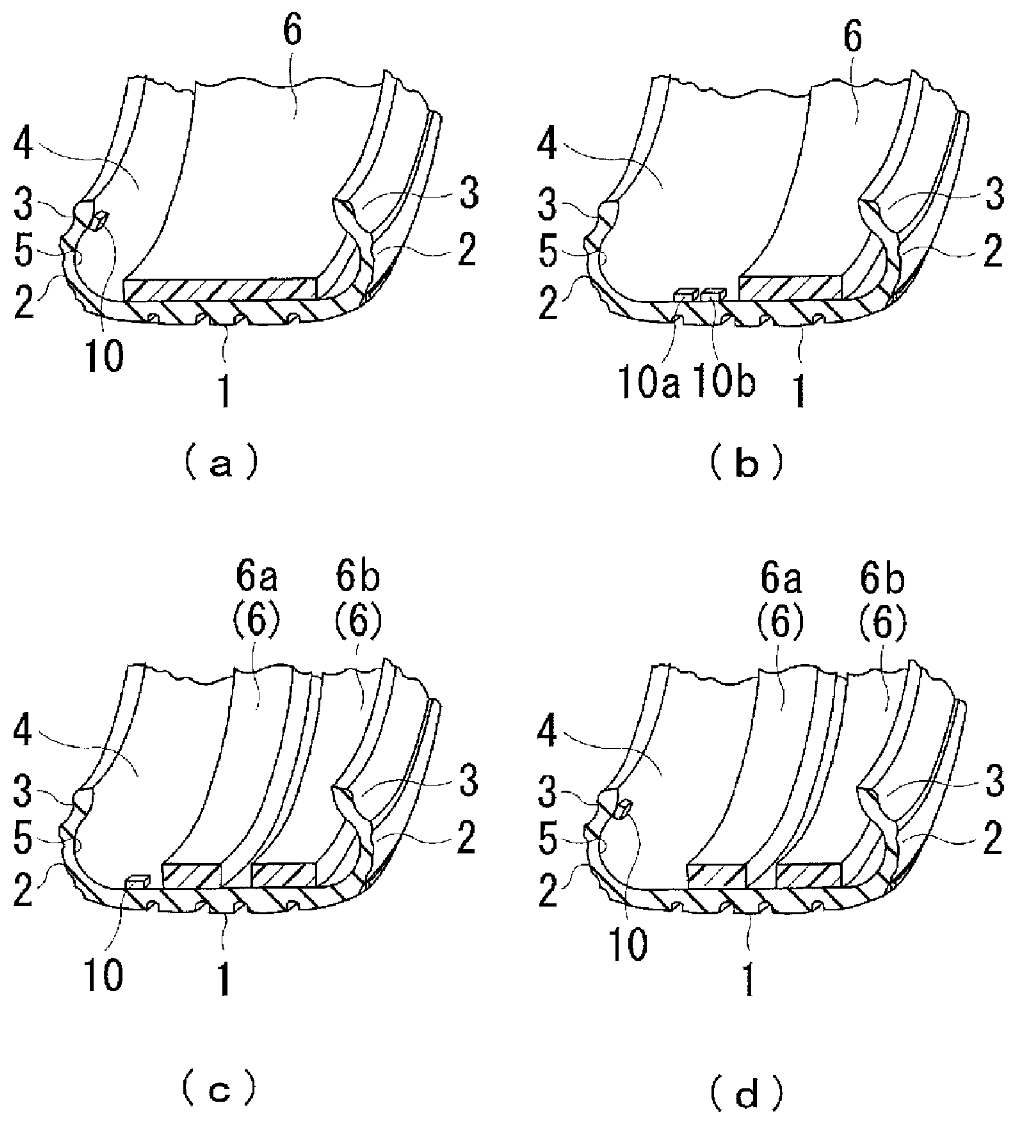
FIGS. 7A to 7D are perspective cross-sectional views illustrating respective pneumatic tires according to other modified examples of an embodiment of the present technology.
Figures 7A, 7B, 7C, 7D:
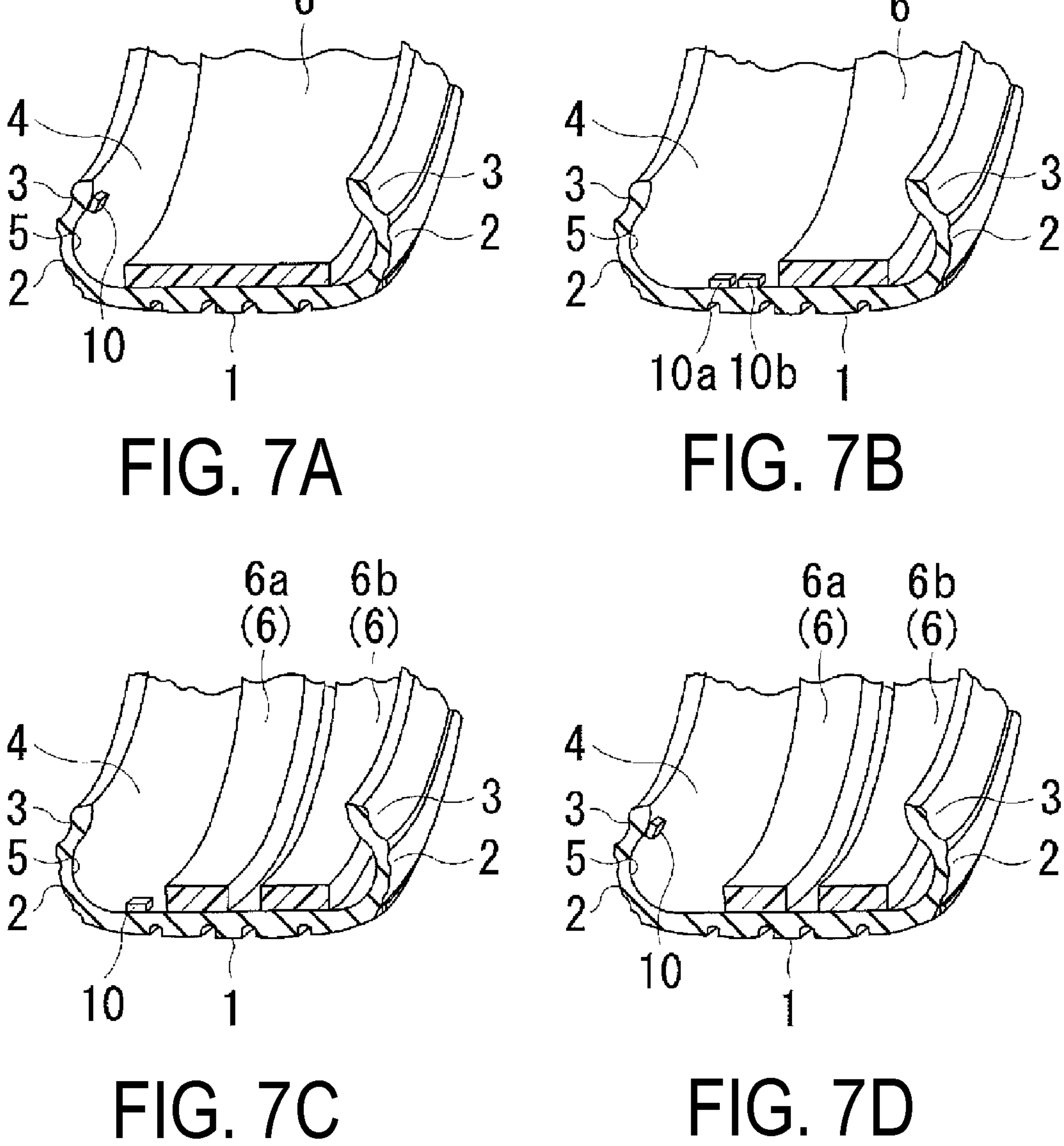

In the embodiment illustrated in FIG. 1, an example in which the correction body 10 is disposed in the region corresponding to the tread portion 1 on the tire inner surface 5, but the present technology is not limited thereto. As other examples, as illustrated in FIG. 7A, a case in which the correction body 10 is disposed in a region corresponding to the bead portion 3 on the tire inner surface 5, and, as illustrated in FIG. 7B, a case in which a plurality of correction bodies 10*a*, 10*b* are disposed in regions corresponding to the tread portion 1 on the tire inner surface 5 can be exemplified. Additionally, while the embodiment of FIG. 5 illustrates an example in which the correction body 10 is disposed between the first sound absorbing member 6*a* and the second sound absorbing member 6*b*, as illustrated in FIG. 7C, a case where the correction body 10 is disposed not between the first sound absorbing member 6*a* and the second sound absorbing member 6*b* but on the outer side in the tire width direction of these sound absorbing members 6, and, as illustrated in FIG. 7D, a case where the correction body 10 is disposed in a region corresponding to the bead portion 3 on the tire inner surface 5 can be exemplified.

Figure 8A:
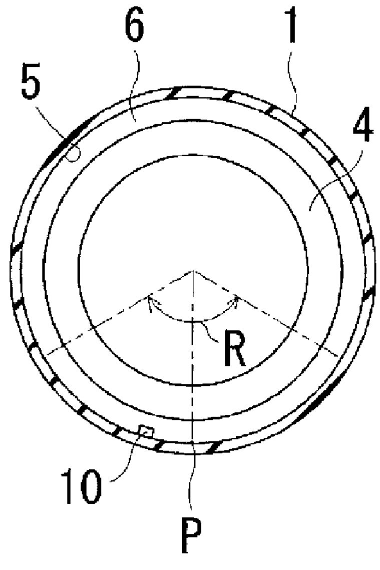
Figure 8B:
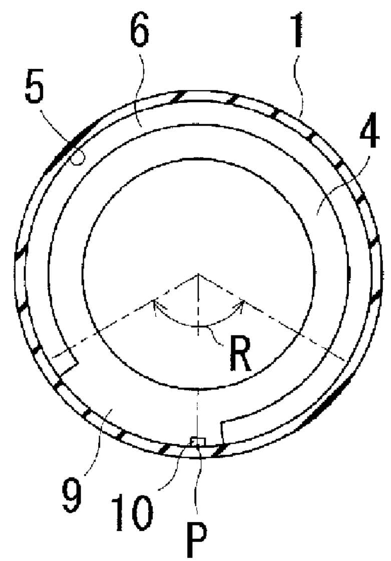
Figure 8C:
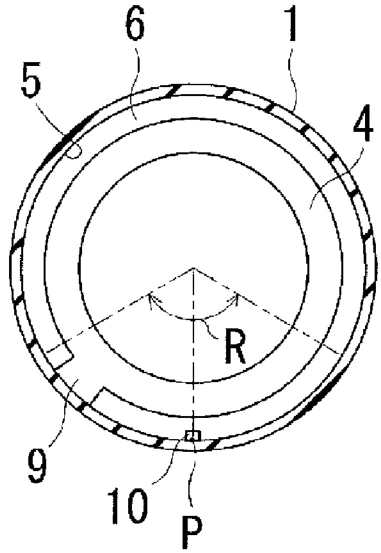

The embodiment of FIG. 2 illustrates an example in which the center of the correction body 10 in the tire circumferential direction and the light point P are matched, but the present technology is not limited thereto. As another example, as illustrated in FIG. 8A, a case in which the center of the correction body 10 in the tire circumferential direction is separated from the light point P can be exemplified. Also, as illustrated in FIG. 8B, a case where one missing portion 9 is provided on the tire circumference, the missing portion 9 is disposed in a range corresponding to the light point P, and the correction body 10 is disposed in the missing portion 9, and as illustrated in FIG. 8C, a case where one missing portion 9 is provided on the tire circumference, the missing portion 9 is disposed at a position in a range corresponding to the light point P and not including the light point P, and the correction body 10 is disposed on the light point P can be exemplified. The missing portion 9 is a portion where the sound absorbing member 6 is not present on the tire circumference. The missing portion 9 is provided in the sound absorbing member 6. This allows for expansion due to inflation of the tire or shear strain of an adhering surface due to contact and rolling to be endured for a long period of time and for shear strain generated at the adhering surface of the sound absorbing member 6 to be effectively alleviated.

EXAMPLE

At a tire size of 275/40R21, at least one sound absorbing member having a band-like shape was bonded to an inner surface of a tread portion along a tire circumferential direction, and a correction body for correcting weight unbalance was fixed to a tire inner surface in a range corresponding to a light point in an entire tire including the sound absorbing member. Tires of Examples 1 to 8 in which the numbers of sound absorbing members, positions of the correction bodies on the tire circumferences, and positions of the correction bodies in tire width directions were differentiated as shown in Table 1 were fabricated.

For comparison, a tire of Comparative Example 1 to which one sound absorbing member was attached to an inner surface of a tread portion and having a structure identical to that of Example 1 except that a correction body was not provided was prepared. Additionally, a tire of Comparative Example 2 to which two sound absorbing members were attached to an inner surface of a tread portion and having a structure identical to that of Example 5 except that a correction body was not provided was prepared.

Note that in Table 1, the position on the tire circumference of the correction body is the position of the correction body on the tire circumference, was measured around the center axis of the tire main body, and was indicated by an angle with respect to a light point. When the position of the correction body in the tire width direction is "outside from the ground contact edge," the position was in a region corresponding to the tread portion on the tire inner surface and was disposed on the outer side in the tire width direction from the ground contact edge.

A yield and adhesiveness between the tire inner surface and the correction body of these test tires were evaluated by the following methods and the results are shown in Table 1.

Yield:

Each of the test tires were manufactured by 100 pieces, mounted on a wheel having a rim size of 21×9.5 J, a load 80% of the maximum load at air pressure of 200 kPa was applied, and a traveling test was performed using a drum testing machine at a speed of 10 km/h. Specifically, a proportion (yield rate) compliant to standard values of uniformity and of dynamic balance was measured. The yield rate of each test tire was used for the evaluation result. Examples 1 to 4 are expressed as index values with the yield rate of the tire of Comparative Example 1 being assigned the value of 100, and Examples 5 to 8 are expressed as index values with the yield rate of the tire of Comparative Example 2 being assigned the value of 100. Larger index values mean an improvement in yield rate and excellent balance of the tire.

Adhesiveness Between Tire Inner Surface and Correction Body:

Each test tire was mounted on a wheel having a rim size of 21×9.5 J, and a traveling test was performed using a drum testing machine at a running speed of 80 km/h, air pressure of 120 kPa, a load of 9.8 kN, and a running distance of 6480 km. After the testing, whether the correction body was separated was visually confirmed. The evaluation results show the presence of separation of the correction body.

TABLE 1-1

| | Comparative Example 1 | Example 1 | Example 2 | Example 3 | Example 4 |
|---|---|---|---|---|---|
| Presence of sound absorbing member (number of sound absorbing members) | Yes (1) | Yes (1) | Yes (1) | Yes (1) | Yes (1) |
| Presence of correction body | No | Yes | Yes | Yes | Yes |
| Position of correction body on tire circumference (deg) | — | 30 | 15 | 0 | 0 |
| Position of correction body in tire width direction | — | Inside from ground contact edge | Inside from ground contact edge | Inside from ground contact edge | Outside from ground contact edge |
| Yield | 100 | 105 | 108 | 110 | 110 |
| Adhesiveness between tire inner surface and correction body Presence of separation of correction body) | — | No | No | No | Yes |

TABLE 1-2

| | Comparative Example 2 | Example 5 | Example 6 | Example 7 | Example 8 |
|---|---|---|---|---|---|
| Presence of sound absorbing member (number of sound absorbing members) | Yes (2) | Yes (2) | Yes (2) | Yes (2) | Yes (2) |
| Presence of correction body | No | Yes | Yes | Yes | Yes |
| Position of correction body on tire circumference (deg) | — | 30 | 15 | 0 | 0 |
| Position of correction body in tire width direction | — | Inside from ground contact edge | Inside from ground contact edge | Inside from ground contact edge | Outside from ground contact edge |
| Yield | 100 | 105 | 108 | 110 | 110 |
| Adhesiveness between tire inner surface and correction body (Presence of separation of correction body) | — | No | No | No | Yes |

As can be seen from Table 1, the tires of Examples 1 to 8 have improved the yields compared with those of Conventional Examples 1 and 2. In particular, the separation of the correction body was absent in the tires of Example 1 to 3 and 5 to 7.

The invention claimed is:

1. A pneumatic tire, comprising:

at least one sound absorbing member having a band-like shape, the sound absorbing member being bonded to a tire inner surface of a tread portion along a tire circumferential direction; and a correction body for correcting weight unbalance being fixed to the tire inner surface of the tread portion in a range corresponding to a light point of an entire tire comprising the sound absorbing member; wherein the light point is a position where a weight of the pneumatic tire is lightest on a circumference of an entirety of the pneumatic tire including the at least one sound absorbing member, a range corresponding to the light point in the entirety of the pneumatic tire is a region within ±60° with respect to the light point around the center axis of a main body of the pneumatic tire, and a separation distance in a tire width direction between the correction body and a closest sound absorbing member of any sound absorbing member bonded to the pneumatic tire, including the at least one sound absorbing member, is not less than 5 mm.

2. The pneumatic tire according to claim 1, wherein the two sound absorbing members are provided, and the sound absorbing members are disposed to be separated from one another in a tire width direction.

3. The pneumatic tire according to claim 2, wherein the correction body is disposed between the sound absorbing members in the tire width direction.

4. The pneumatic tire according to claim 2, wherein a first sound absorbing member constituting the sound absorbing member is disposed on one side in a tire width direction from a position 40% of a width of a land portion from an end portion on the one side in the tire width direction to another side in the tire width direction of the land portion on a tire equator line, a second sound absorbing member constituting the sound absorbing member is disposed on the other side in the tire width direction from the position 40% of the width of the land portion from an end portion on the other side in the tire width direction to the one side in the tire width direction of the land portion, and the first sound absorbing member and the second sound absorbing member constituting the sound absorbing member are separated by 60% or greater of the width of the land portion.

5. The pneumatic tire according to claim 1, wherein the correction body is disposed closer to an inner side in a tire width direction than a ground contact edge.

6. The pneumatic tire according to claim 1, wherein an amount of silicon in a release agent detected in at least a fixed region of the correction body by a fluorescence X-ray analysis method is not greater than 10.0 wt. %.

7. The pneumatic tire according to claim 1, wherein a thickness of a release agent detected in at least a fixed region of the correction body by an electron microscope is not greater than 100 μm.

8. The pneumatic tire according to claim 1, wherein the correction body is fixed to the tire inner surface via an adhesive layer, and an adhesive strength of the adhesive layer is in a range of from 0.4 $N/mm^2$ to 100 $N/mm^2$.

9. The pneumatic tire according to claim 8, wherein the adhesive layer is made of a cyanoacrylate-based adhesive.

10. The pneumatic tire according to claim 1, wherein the correction body is directly adhered to the tire inner surface.

11. The pneumatic tire according to claim 1, wherein a base is inserted between the correction body and the tire inner surface.

12. The pneumatic tire according to claim 1, wherein as a tire inner surface roughness in a fixed region of the correction body, an arithmetic mean height Sa is in a range of from 0.3 μm to 15.0 μm, and a maximum height Sz is in a range of from 2.5 μm to 60.0 μm.

13. The pneumatic tire according to claim 1, wherein the correction body is a sensor unit.

14. A pneumatic tire, comprising:

at least one sound absorbing member having a band-like shape, the sound absorbing member being bonded to a tire inner surface of a tread portion along a tire circumferential direction; and a correction body for correcting weight unbalance being fixed to the tire inner surface of the tread portion in a range corresponding to a light point of an entire tire comprising the sound absorbing member; wherein the at least one sound absorbing member is continuous in the tire circumferential direction, and the correction body is disposed only axially outward of an axially outermost edge of the sound absorbing member.

15. A pneumatic tire, comprising:

at least one sound absorbing member having a band-like shape, the sound absorbing member being bonded to a tire inner surface of a tread portion along a tire circumferential direction; and a correction body for correcting weight unbalance being fixed to the tire inner surface of the tread portion in a range corresponding to a light point of an entire tire comprising the sound absorbing member; wherein the correction body is fixed at a position circumferentially offset from any gap of any sound absorbing member bonded to the pneumatic tire, including the at least one sound absorbing member, and the correction body is a sensor unit.

* * * * *